Dec. 16, 1952 A. G. COOLEY 2,622,001

STYLUS RESET MECHANISM FOR FACSIMILE MACHINES

Filed Jan. 27, 1949 2 SHEETS—SHEET 1

INVENTOR.
AUSTIN G. COOLEY
BY John J. Rogan
ATTORNEY

Dec. 16, 1952 A. G. COOLEY 2,622,001

STYLUS RESET MECHANISM FOR FACSIMILE MACHINES

Filed Jan. 27, 1949 2 SHEETS—SHEET 2

INVENTOR.
AUSTIN G. COOLEY
BY John J. Rogan
ATTORNEY

Patented Dec. 16, 1952

2,622,001

UNITED STATES PATENT OFFICE 2,622,001

STYLUS RESET MECHANISM FOR FACSIMILE MACHINES

Austin G. Cooley, New York, N. Y., assignor to Times Facsimile Corporation, New York, N. Y., a corporation of New York Application January 27, 1949, Serial No. 73,187

13 Claims. (Cl. 346—139)

This invention relates to facsimile machines and more particularly to facsimile machines of the lead-screw controlled type.

A principal object of the invention is to provide an improved automatic resetting arrangement for the movable head of a facsimile machine and the like.

Another object is to provide an improved resetting mechanism for facsimile machines whereby the recording head can be returned to its normal or starting position from any desired point in its recording traverse, and also for automatically returning it to normal after it has executed its complete traverse.

A feature of the invention relates to a facsimile machine employing a rotating drum and a recording stylus which is traversed by a lead screw parallel to the drum length, and having novel means for automatically disengaging the stylus from a recording blank on the drum and for restoring it to its normal position adjacent one end of the drum.

Another feature relates to an arrangement for automatically resetting to normal the stylus of a motor-driven facsimile recorder whenever the circuit of the driving motor is opened.

A further feature relates to the novel organization, arrangement and relative location and interconnection of parts which cooperate to reset the stylus of a facsimile recorder or the like.

Other features and advantages not particularly enumerated, will be apparent after a consideration of the following detailed descriptions and the appended claims.

In the drawing, which shows by way of example one preferred embodiment,

Figure 1:
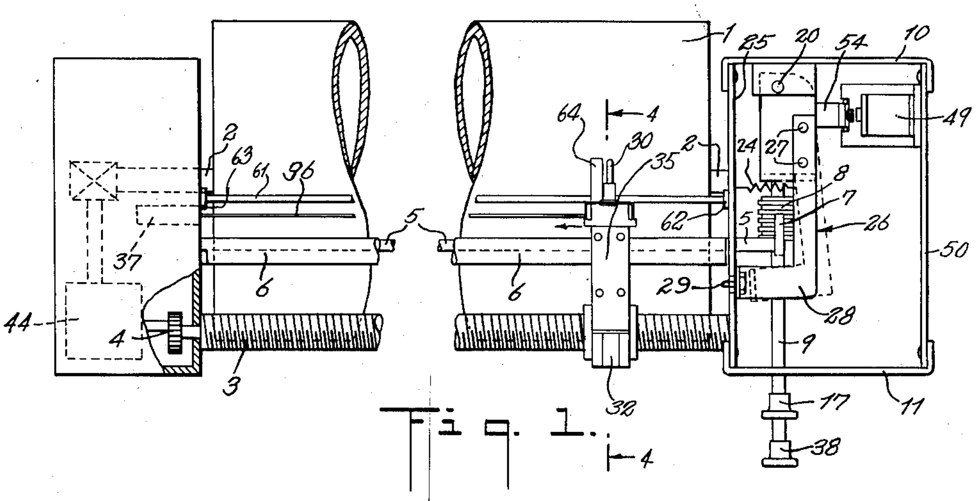
Fig. 1 is a top plan view of a portion of a facsimile machine embodying the invention.

Referring to Fig. 1, the numeral 1 represents any well-known rotary support or scanning drum such as is conventionally employed in facsimile machines. This drum is preferably of hollow cylindrical metal construction, and around its periphery is wrapped and suitably held any well-known recording blank (not shown) which is responsive to stylus-applied electric signals. This blank, for example, may be of the kind disclosed in U. S. Patent No. 2,398,779. The drum shaft 2 is supported for rotation in suitable bearings (not shown) and is arranged to be coupled to any suitable driving motor 44 for rotating the drum at a uniform predetermined speed.

Also rotatably supported at its ends in suitable bearings so as to extend parallel to the drum axis, and located slightly above and to the rear of the drum, is a lead screw 3. Screw 3 has fastened to one end, a gear 4 which is driven from the drum driving motor and in fixed timed relation to the rate of drum rotation. It will be seen, therefore, that neither the drum nor the lead screw is capable of longitudinal motion during the recording operation. Also mounted in fixed parallelism with lead screw 3 is a rocker bar 5 which is supported at its opposite ends in suitable bearings (not shown). Bar 5 has rigidly fastened to it throughout substantially its entire length so as to be coextensive with the drum 1, an eccentric cam sleeve 6. Fastened to the right-hand end of bar 5 is a sector gear 7 which is in toothed engagement with a cylindrical rack 8 which is slidably mounted on a rod 9. Rod 9 is supported for reciprocating motion in the stationary frame members 10, 11, of the machine. The member 8 is resiliently pressed against a collar 12 (Fig. 3) pinned to rod 9, by means of a coiled spring 13 having one end abutting against a collar 14 which is also pinned to rod 9. The rod 9 is normally urged to the left, as represented in dotted outline in Fig. 2, by means of a coiled spring 15 abutting at one end against frame 10 and at the other end against shoulder 16 pinned to rod 9. Rod 9, at its left-hand end, is provided with a suitable push-button 17.

Figure 2:
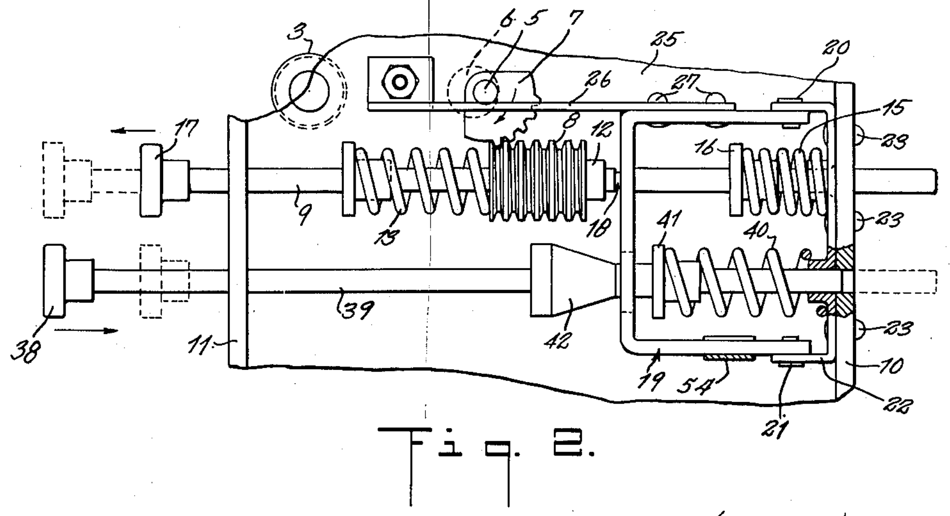
Fig. 2 is an enlarged right-hand end view of part of Fig. 1.
Figure 3:
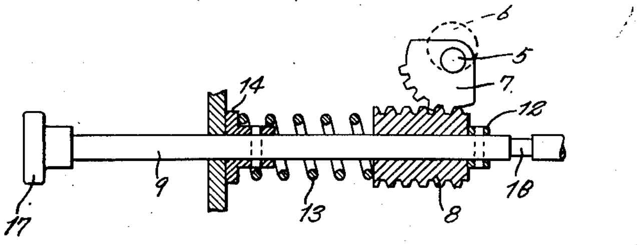
Fig. 3 is a detail view, partly sectional, of a portion of Figs. 1 and 2.

Consequently when button 17 is pressed to move the rod 9 to the full-line position as seen in Fig. 2, the sector gear 7 and the cam bar 5 are rotated from the position shown in Fig. 3 to the position shown in Fig. 2.

In order to lock the rod 9 and the member 6 in the position shown in Fig. 2, the rod 9 has a peripheral notch 18 which is adapted to be engaged by a swingable U-shaped frame 19 which is pivotally supported at pivots 20, 21, in a bracket 22, riveted at 23 to frame member 10. A spring 24 has one end fastened to stationary frame member 25, and the opposite end is fastened to an arm 26, riveted at 27 to the swingable frame 19. The arm 26 has a right-angled portion 28 carrying at its end a pin 29 which, when the frame 19 is in locking relation with notch 16, projects through an opening in the plate 25 for purposes to be described. Thus, once the button 17 has been pushed to rotate the bar 5, the parts are held in the relation shown in Fig. 2 by means of latch frame 19.

The frame 19 is arranged to be moved out of locking engagement with the rod 9 either when the recording stylus has completed its recording traverse from one end of the drum to the other; or it is arranged to be unlocked at any desired point in the said traverse. In either case, it is necessary that the stylus be removed from contact with the recording blank. As shown more clearly in Figs. 1, 4 and 5, the stylus 30 is supported in a stylus carrier comprising a metal block 31 having at its left-hand end an integral bearing 32 which is adapted to freely fit around the lead screw 3. The interior surface of member 32 is smooth or unthreaded so that it can slide freely along the lead screw 3 when the stylus is being returned to normal. Slidably supported in the block 31 is a member 33 having its left-hand end formed with a sector thread 34 which is adapted to engage the threads on the lead screw 3 when the member 33 is held in its extreme left-hand position as represented by the full lines in Fig. 4. In order to guide and support the member 33, it is provided with a flat plate 35 which rides on the top flat surface of block 31, the length of plate 35 being greater than the slot or opening in block 31. It will be observed, of course, that the bearing member 32 does not completely extend around the lead screw 3, thus enabling the member 33 to be moved into and out of engagement with the lead screw threads. When the member 33 has its sector tooth 34 in engagement with the lead screw 3, the continued rotation of the lead screw causes the block 31 and the stylus 30 to be fed positively towards the right (Fig. 1), parallel to the length of drum 1. The rate of this longitudinal movement will, of course, be determined by the rotational speed of screw 3 and by the pitch of its threads.

On the other hand, when the member 33 is disengaged from the lead screw 3, the block or stylus carrier 31 is free to slide on the screw 3. Attached at one end to the block 31 is a cord or wire 36, the other end of this cord or wire being wound around a spring drum 37. The spring of drum 37 is coiled or tensioned so that when the member 33 is disengaged from the screw 3, the stylus holder and stylus are immediately pulled to the left-hand end of the drum.

In order to control the disengagement of the member 33 from the lead screw, the block 31 and the member 33 have aligned circular openings through which passes the rockable bar 5 with its integral cam bar 6. Thus when the button 17 is pressed and locked in pressed position as above described, the bar 5 with its eccentric cam 6 rotates sufficiently to move the member 33 into threaded engagement with the lead screw 3, as represented in the full-line position of Fig. 4. In this position the block 31 is in such relation which respect to drum 1, so as to permit the stylus 30 to be in recording contact with the blank on drum 1. However, when the bar 5 and its eccentric cam 6 are rotated as a result of the unlocking of rod 9, the member 33 is moved to the dotted-line position shown in Fig. 4, and at the same time the right-hand end of block 31 is raised sufficiently so that the stylus 30 clears the recording blank. Consequently, by reason of the tension on cord 36, the stylus holder and the stylus are rapidly returned to the left-hand end of the drum.

In order to effect the return of the stylus and its holder to the normal position from any desired point in the stylus traverse, there is provided another manually-operable push-button 38 attached to a rod 39 slidably mounted in the frame members 10 and 11. Rod 39 is normally held in its left-hand position, as seen in Fig. 2, by means of a coiled spring 40 abutting at one end against bracket 22 and at the other end against a shoulder 41 pinned to rod 39. Fastened to rod 39 is a tapered member 42. When the rod 39 is in its full-line position, the tapered member 42 is out of engagement with the frame 19. However when the button 38 is pressed to move the rod 39 to the dotted-line position, the member 42 engages frame 19 and swings it from locking engagement with the rod 9. Under this condition the bar 5 rotates the stylus out of engagement with the record blank, and the stylus and its holder are returned to normal by the tensioned cord 36 as above described.

If the stylus is to effect a complete traversal of the drum, then when it arrives at its extreme right-hand position (Fig. 1), it engages the pin 29 and rotates the arm 26 and frame 19 out of locking engagement with rod 9, thus also permitting the stylus and its holder to be returned immediately to normal position.

Under certain circumstances it may be desirable to effect automatic resetting of the stylus to its normal position whenever the motor circuit is opened. Ordinarily, facsimile machines are provided with a control switch such for example as the switch 43 which can be moved to a number of positions. For example, in the start position, the switch 43 may connect the drum driving motor 44 to a suitable local source of power (not shown) to bring the drum up to the desired speed; then when the switch is moved to the synchronizing position, the motor is synchronized and phased with the distant transmitting motor; then the switch is moved to the final or "run" position, wherein the local source of frequency-controlled power maintains the motor at its proper running speed. The switch 43, in accordance with one feature of the present invention, may have an additional switch arm 45 which is effective when the switch is in the "run" position to connect the positive potential terminal 46 of a suitable D. C. source in circuit with a storing condenser 47. One terminal of the condenser 47 is grounded and is connected to a terminal 48 of the winding of a suitable electromagnet 49 anchored to frame member 50; the other terminal of this winding is connected to another contact on the switch, for example contact 51. Therefore as long as the running circuit of the motor is closed, the condenser 47 remains charged, and no current flows through the winding of magnet 49. If, however, the switch is turned to any other position than the "run" position, for example the synchronizing position, the charge on condenser 47 discharges through the winding of magnet 49 and causes this magnet to attract its armature 52 against the tension of spring 53. Armature 52 is provided with a yoke member 54 so that when the said armature is attracted, it engages the frame 19 and pivots it against the tension of spring 15, thus unlocking the rod 9 and permitting the stylus and its holder to be reset to normal as above described.

Figure 4:
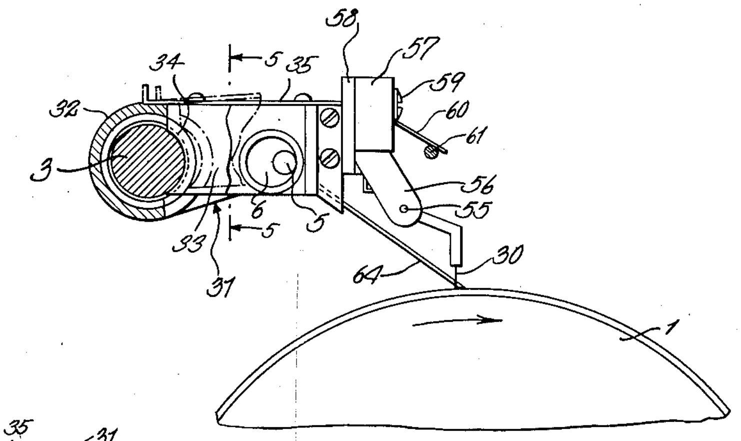
Fig. 4 is an enlarged view, partly sectional, of the stylus holder and control mechanism therefor.
Figure 5:
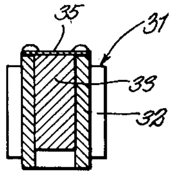
Fig. 5 is a sectional view of Fig. 4 taken along the line 5—5 thereof.
Figure 6:
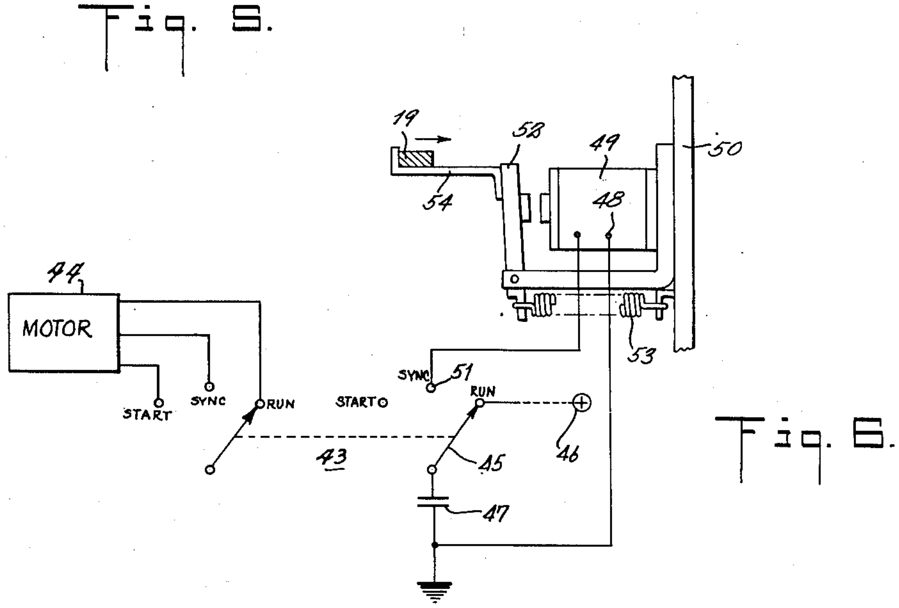
Fig. 6 is a schematic diagram of the interlock between the motor control circuit and the stylus reset mechanism.

As shown more clearly in Fig. 4, the stylus 30 is pivotally supported at 55 in a bracket 56 carried by a block 57 which is carried by the stylus block 31. However, the block 57 and therefore the stylus 30 are insulated from the metal frame of the machine by an intervening block 58 of suitable insulation. Also attached to the front of block 57 by screw 59 is a flexible or spring wiper 60 which is adapted to flexibly engage the contact rail 61 that extends longitudinally of the machine. This rail is insulatingly mounted in suitable insulator bushings 62, 63, and is arranged to be connected by a conductor (not shown) to the high voltage terminal of the recording current supply, the other terminal of this supply may be grounded, as is the frame work of the machine. Also carried by the block 31 is a flat spring member 64 which is adapted to lightly press against the surface of the recording blank that is to be mounted on drum 1, to hold it flat against the drum at the region where the stylus 30 engages the blank.

While one particular embodiment has been described herein, it will be understood that various changes and modifications may be made therein without departing from the spirit and scope of the invention.

What is claimed is:

1. A facsimile recorder, comprising, a rotatable drum, a recording stylus, a motor for operating said carrier and drum, a carrier for said stylus, a lead screw for traversing said stylus and carrier with respect to said drum, a shiftable member movable as a unit with said carrier for coupling said carrier to said lead screw, manually-operable means for moving said shiftable member into threaded engagement with said lead screw and for simultaneously moving said stylus into recording relation with said drum, locking means for locking said shiftable member in said threaded engagement with said lead screw, and means responsive to the opening of the running circuit of the motor to unlock said locking means to return said carrier and stylus to a normal position with respect to said drum.

2. A facsimile recorder according to claim 1, in which the last-mentioned means includes an electromagnet having an armature coupled to said locking means, and circuit connections responsive to the opening of the said motor-running circuit for causing said armature to unlock said locking means.

3. A facsimile recorder according to claim 2, in which said circuit connections include a condenser having a charging circuit and a discharging circuit and a manually-operable motor control switch for applying the condenser charge to operate said electromagnet.

4. A facsimile recorder, comprising, a rotatable scanning drum, a recording stylus, a carrier for said stylus, a lead screw for traversing said carrier with respect to said drum, means normally tending to reset said carrier to a position adjacent one end of said drum, a shiftable member for coupling said carrier to said lead screw, manually operable means for operating said member into said coupling relation, locking means for locking said shiftable member in said coupled relation, means effective when said carrier reaches a predetermined point in its traverse for operating said locking means to decouple said shiftable member from said lead screw and for simultaneously moving said stylus away from said drum, said manually operable means including rotatable cam means for partially rotating said carrier around said lead screw to bring said stylus into recording relation with said drum and for simultaneously moving said shiftable member into threaded engagement with said lead screw, and additional manually operable means to operate said locking means for decoupling said shiftable member from said lead screw and for simultaneously and automatically moving said stylus away from said drum at any desired point between the limits of movement of said carrier.

5. A facsimile recorder, comprising, a rotatable scanning drum, a recording stylus, a carrier for said stylus, a lead screw for traversing said carrier with respect to said drum, means normally tending to reset said carrier to a position adjacent one end of said drum, a shiftable member for coupling said carrier to said lead screw, manually operable means for operating said member into said coupling relation, locking means for locking said shiftable member in said coupled relation, means effective when said carrier reaches a predetermined point in its traverse for operating said locking means to decouple said shiftable member from said lead screw and for simultaneously moving said stylus away from said drum, said manually operable means including a rocker bar extending parallel to the drum length, said bar carrying an integral eccentric cam which passes through said carrier and said shiftable member.

6. A facsimile recorder, comprising, a rotatable scanning drum, a recording stylus, a carrier for said stylus, a lead screw for traversing said carrier with respect to said drum, means normally tending to reset said carrier to a position adjacent one end of said drum, a shiftable member for coupling said carrier to said lead screw, manually operable means for operating said member into said coupling relation, mechanically latching means for locking said shiftable member in said coupled relation, means effective when said carrier reaches a predetermined point in its traverse for mechanically operating said latching means to decouple said shiftable member from said lead screw and for simultaneously moving said stylus away from said drum, said manually operable means including a rocker bar extending parallel to the drum length, said bar carrying an integral eccentric cam for cooperation with said carrier and said shiftable member, and manually-operable push-button means normally urging said bar to a position wherein said stylus is held out of contact with said drum and said shiftable member is held out of threaded engagement with said lead screw.

7. A facsimile recorder, comprising, a rotatable scanning drum, a recording stylus, a carrier for said stylus, a lead screw for traversing said carrier with respect to said drum, means normally tending to reset said carrier to a position adjacent one end of said drum, a shiftable member for coupling said carrier to said lead screw, manually operable means for operating said member into said coupling relation, locking means for locking said shiftable member in said coupled relation, means effective when said carrier reaches a predetermined point in its traverse for mechanically operating said locking means to decouple said shiftable member from said lead screw and for simultaneously moving said stylus away from said drum, said manually operable means including a rotatable eccentric cam extending parallel to the drum length, a manually shiftable bar, cooperating toothed elements carried respectively by said bar and said cam, resilient means normally urging said toothed elements to rotate said cam to hold said stylus out of recording relation with said drum and for holding said shiftable member out of threaded engagement with said lead screw, and a latch frame to lock said cam in operated position.

8. A facsimile recorder, comprising, a rotatable scanning drum, a recording stylus, a carrier for said stylus, a lead screw for traversing said carrier with respect to said drum, means normally tending to reset said carrier to a position adjacent one end of said drum, a shiftable member for coupling said carrier to said lead screw, manually operable means for operating said member into said coupling relation, mechanically locking means for locking said shiftable member in said coupled relation, means effective when said carrier reaches a predetermined point in its traverse for mechanically operating said locking means to decouple said shiftable member from said lead screw and for simultaneously moving said stylus away from said drum, said manually operable means including a shiftable push-button bar, and said locking means includes a pivotally mounted member which is adapted to latch with said bar when said bar has been operated to effect coupling of said shiftable member with said lead screw, and additional means for manually operating said locking means to decouple said shiftable member from said lead screw and simultaneously to move said stylus away from said drum at any desired point intermediate the limits of travel of said carrier.

9. A facsimile recorder, comprising, a rotatable drum, a recording stylus, a carrier for said stylus, a lead screw for traversing said carrier and said stylus with respect to said drum, a shiftable member movable as a unit with said carrier for coupling said carrier to said lead screw, manually-operable means for moving said shiftable member into threaded engagement with said lead screw and for simultaneously moving said stylus into recording relation with said drum, means for mechanically locking said shiftable member to hold it in threaded engagement with said lead screw, the last mentioned means including a pivoted locking latch mounted to be engaged by said carrier when said stylus has completed its traverse of said drum for mechanically swinging said latch and thereby mechanically unlocking said locking means, and means responsive to said unlocking for automatically restoring said stylus carrier and stylus to a normal position adjacent one end of said drum.

10. A facsimile recorder according to claim 9, in which said locking means also includes a manually-shiftable bar adapted to latch with said pivoted locking latch to hold it in locked position, and the said means which is effective when said stylus has completed its traverse includes a member attached to said locking latch and engageable by the stylus carrier at the end of its traverse for unlocking said locking latch.

11. A facsimile recorder according to claim 9, in which said manually-operable means includes a push-button-controlled eccentric cam extending along and parallel to the drum and upon which said carrier and said shiftable member ride.

12. A facsimile recorder, comprising, a rotatable drum, a recording stylus, a carrier for said stylus, a lead screw for traversing said carrier and said stylus with respect to said drum, a shiftable member movable as a unit with said carrier for coupling said carrier to said lead screw, manually-operable means for moving said shiftable member into threaded engagement with said lead screw and for simultaneously moving said stylus into recording relation with said drum, means for mechanically locking said shiftable member to hold it in threaded engagement with said lead screw, the last mentioned means including a pivoted locking latch mounted to be engaged by said carrier when said stylus has completed its traverse of said drum for mechanically swinging said latch and thereby mechanically unlocking said locking means, and means responsive to said unlocking for automatically removing said stylus out of recording relation with said drum.

13. A facsimile recorder, comprising, a rotatable drum, a recording stylus, a carrier for said stylus, a lead screw for traversing said carrier and said stylus with respect to said drum, a shiftable member movable as a unit with said carrier for coupling said carrier to said lead screw, manually-operable means for moving said shiftable member into threaded engagement with said lead screw and for simultaneously moving said stylus into recording relation with said drum, means for mechanically locking said shiftable member to hold it in threaded engagement with said lead screw, the last mentioned means including a pivoted locking latch mounted to be engaged by said carrier when said stylus has completed its traverse of said drum for mechanically swinging said latch and thereby mechanically unlocking said locking means.

AUSTIN G. COOLEY.

REFERENCES CITED

The following references are of record in the file of this patent:

UNITED STATES PATENTS

| Number | Name | Date |
|---|---|---|
| 2,133,104 | Logan | Oct. 11, 1938 |
| 2,251,603 | Schiff | Aug. 5, 1941 |
| 2,260,862 | O'Brien et al. | Oct. 28, 1941 |
| 2,266,273 | Schiff | Dec. 16, 1941 |
| 2,435,260 | Wise et al. | Feb. 3, 1948 |